United States Patent
Horowy et al.

(10) Patent No.: US 10,049,819 B2
(45) Date of Patent: Aug. 14, 2018

(54) MULTILAYER CAPACITOR WITH INTEGRATED BUSBAR

(71) Applicant: HAMILTON SUNDSTRAND CORPORATION, Windsor Locks, CT (US)

(72) Inventors: John Horowy, Rockford, IL (US); Gary L. Galloway, Rockford, IL (US); Debabrata Pal, Hoffman Estates, IL (US); Eric Karlen, Rockford, IL (US); Mark W. Metzler, Davis, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/378,722

(22) Filed: Dec. 14, 2016

(65) Prior Publication Data
US 2017/0098504 A1    Apr. 6, 2017

Related U.S. Application Data

(62) Division of application No. 14/168,204, filed on Jan. 30, 2014, now Pat. No. 9,552,926.

(51) Int. Cl.
*H01G 4/228* (2006.01)

(52) U.S. Cl.
CPC .................................. *H01G 4/228* (2013.01)

(58) Field of Classification Search
CPC ........................................................ H01G 4/228
See application file for complete search history.

(56) References Cited

U.S. PATENT DOCUMENTS

| | | | | |
|---|---|---|---|---|
| 3,686,523 A | * | 8/1972 | Gorden | H02K 11/042 310/68 R |
| 4,266,091 A | * | 5/1981 | Fukuda | H02G 5/005 174/72 B |
| 4,399,321 A | * | 8/1983 | Gottlieb | H02G 5/005 174/72 B |
| 4,423,510 A | * | 12/1983 | Pack | H01G 4/30 372/56 |
| 4,916,576 A | * | 4/1990 | Herbert | H01G 4/228 333/181 |
| 5,982,018 A | * | 11/1999 | Wark | H01L 23/13 257/532 |
| 7,730,434 B2 | | 6/2010 | Aghababazadeh | |
| 8,161,431 B2 | | 4/2012 | Buonpane et al. | |
| 8,627,556 B2 | | 1/2014 | Martin | |
| 2004/0015787 A1 | | 1/2004 | Heydler | |
| 2005/0015175 A1 | * | 1/2005 | Huang | B29C 41/02 700/121 |

(Continued)

FOREIGN PATENT DOCUMENTS

CH        2450924 A1 *  5/2012  ............ H01G 11/32

*Primary Examiner* — Mary Ellen Bowman
(74) *Attorney, Agent, or Firm* — Cantor Colburn LLP

(57) ABSTRACT

Embodiments are directed to obtaining a specification of at least one operational requirement for at least one capacitor, generating a design of the at least one capacitor to satisfy the at least one operational requirement, the design of the at least one capacitor comprising a plurality of layers and a first integrated busbar coupled to at least a portion of the layers, and based on the design, manufacturing the at least one capacitor by utilizing an additive manufacturing technique.

12 Claims, 4 Drawing Sheets

(56) References Cited

U.S. PATENT DOCUMENTS

| | | |
|---|---|---|
| 2008/0148197 A1 | 6/2008 | Bickford |
| 2010/0042376 A1 | 2/2010 | Weatherhead |
| 2015/0213952 A1 | 7/2015 | Horowy et al. |
| 2015/0255217 A1* | 9/2015 | Nishiyama ............... H01G 4/30 |
| | | 318/400.3 |

* cited by examiner

MULTILAYER CAPACITOR WITH INTEGRATED BUSBAR

DOMESTIC PRIORITY

This application is a divisional of U.S. patent application Ser. No. 14/168,204, filed Jan. 30, 2014, the disclosure of which is incorporated by reference herein in its entirety.

BACKGROUND

Sufficient bus capacitance is needed to ensure that a solid state power source operates in accordance with power quality requirements. Typical requirements include highly localized capacitance and minimal series inductance, while adhering to one or more package constraints. Such requirements impose challenges in terms of size, cost, and thermal performance. For example, it is desirable to be able to cheaply manufacture capacitors to fit into a small form-factor or profile while still being able to operate the capacitors at elevated power levels and temperatures.

BRIEF SUMMARY

An embodiment is directed to a method comprising: obtaining a specification of at least one operational requirement for at least one capacitor, generating a design of the at least one capacitor to satisfy the at least one operational requirement, the design of the at least one capacitor comprising a plurality of layers and a first integrated busbar coupled to at least a portion of the layers, and based on the design, manufacturing the at least one capacitor by utilizing an additive manufacturing technique.

An embodiment is directed to a capacitor manufactured by application of an additive manufacturing technique, comprising: a plurality of conductor layers, a plurality of dielectric layers interspersed between the conductor layers, and a first busbar coupled to a first subset of the conductor layers, the first subset comprising at least two layers.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
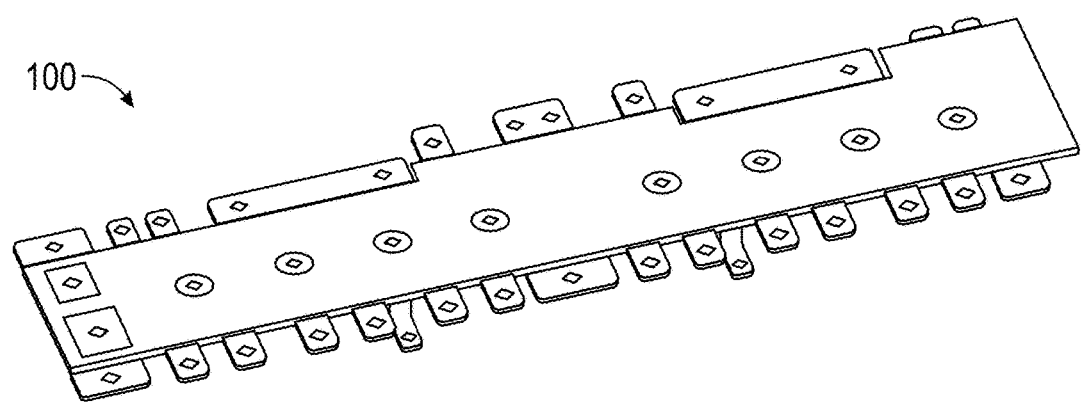
FIGS. 1A-1C illustrate an exemplary drawing of an assembly comprising a plurality of capacitors.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems and methods are described for providing an ability to cheaply manufacture capacitors to fit into a small form-factor or profile while still being able to operate the capacitors at elevated power levels and temperatures. Embodiments may leverage additive manufacturing techniques in the manufacture or fabrication of one or more capacitors. The capacitors may be manufactured in accordance with one or more shapes or geometries. In some embodiments, a capacitor may include an integrated busbar. The integrated busbar may couple to a second busbar that is external to the capacitor. One or more parameters of the integrated busbar may be selected based on electrical (e.g., power) and thermal considerations.

Figure 1B:
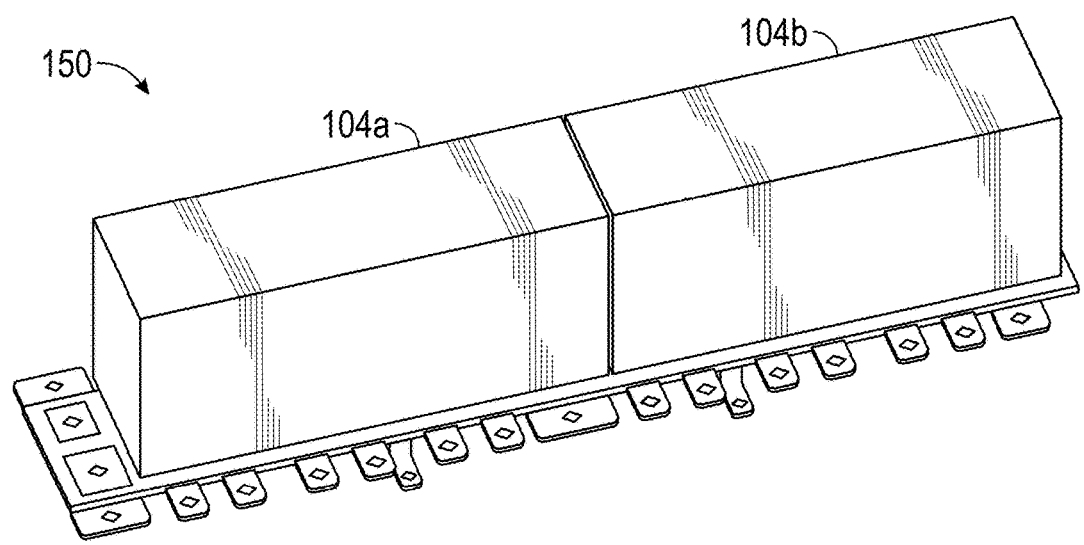
Figure 1C:
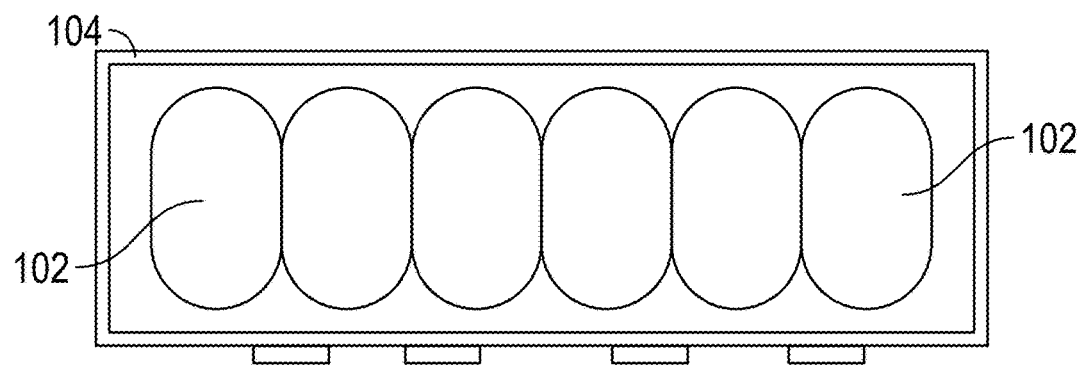

Referring to FIGS. 1A-1C (collectively referred to as FIG. 1), a drawing 100 of an assembly 150 is shown. The assembly 150 may include a number of devices or components, such as one or more capacitors 102. The capacitors 102 may be included in one or more enclosures or housings 104. For example, in the exemplary embodiment shown in FIG. 1, two capacitor housings 104 may be included providing for a nominal total capacitance equal to five-hundred microfarads (500 mFd), wherein a first set of six capacitors 102 may be located in a first housing 104a, and a second set of six capacitors 102 may be located in a second housing 104b. One skilled in the art would appreciate that a different number of capacitors 102, a different value of total capacitance, and/or a different number of capacitors per housing 104 may be used in some embodiments.

Figure 2:
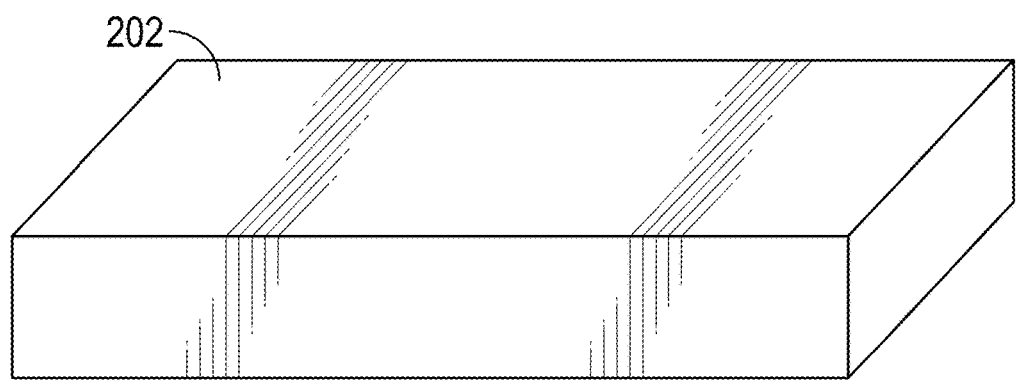
FIG. 2 illustrates a form-factor for a capacitor.

The embodiment shown in FIG. 1 represents the capacitors 102 having been manufactured in accordance with a "can or box-like" shape or geometry. FIG. 2 shows another exemplary embodiment, wherein a capacitor 202 has a brick-like shape. In some embodiments, the capacitor 202 may be used as an alternative to, or as a supplement to, one or more of the capacitors 102.

As described herein, additive manufacturing techniques may be used in some embodiments to construct a capacitor. The shapes for the capacitors 102 and 202 are illustrative. In some embodiments, other geometries or shapes may be used. For example, 'L', 'Z', and 'snake' shapes may be used for a capacitor in some embodiments.

Referring back to FIG. 1, if the assembly 150 and its constituent components are manufactured using conventional techniques, the capacitors 102 may be formed by bringing two pre-existing plates into proximity with one another. For example, using conventional manufacturing techniques, the two plates may be arranged so as to be substantially parallel to one another, and a (pre-existing) dielectric material may be inserted between the plates.

Figure 3:
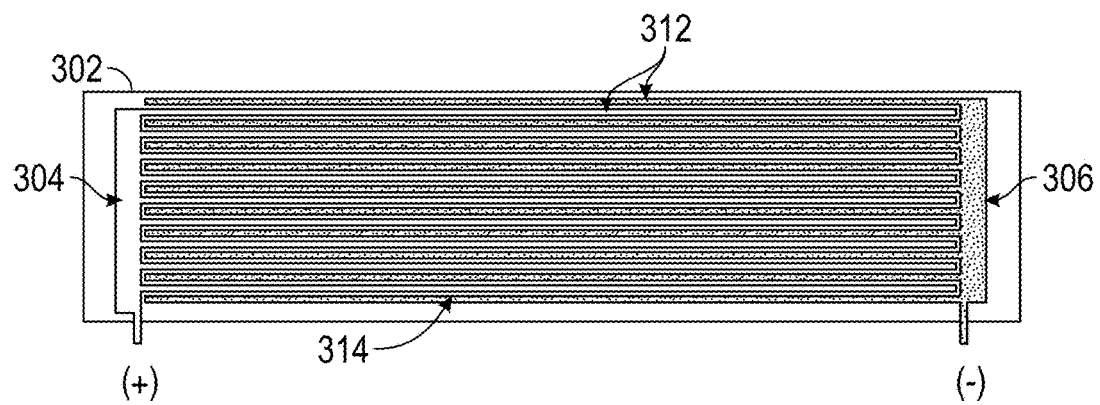
FIG. 3 illustrates a printed power capacitor comprising an integrated busbar.

Turning to FIG. 3, an example of a power capacitor 302 is shown. In some embodiments, the capacitor 302 may correspond to one or more of the capacitors 102 and 202 of FIGS. 1-2. The capacitor 302 may be manufactured using cold spray and additive manufacturing techniques, such that the capacitor 302 may be built "from the ground-up." A direct write technology and a laser engineered net shaping (LENS) technique may be used to manufacture the capacitor 302. The direct write technology, which may serve to deposit material for electric pathways, may allow for a distribution of capacitance, which would result in a reduction in inductance (relative to conventional manufacturing techniques) for the same capacitor performance. The LENS technique may be used to fabricate parts (e.g., metal parts) for the capacitor 302 from a computer-aided design (CAD) model by using a powder injected into a molten pool created by a laser beam.

The capacitor 302 may include one or more integrated busbars, such as busbars 304 and 306. The busbar 304 may couple to a positive (+) voltage bus of a power supply and the busbar 306 may couple to a negative (−) or reference voltage bus of the power supply. The busbars 304 and 306 may be included so as to reduce the temperature of the capacitor 302 when the capacitor 302 dissipates heat.

The busbars 304 and 306 may be associated with printed graphite conductor layers 312. The conductor layers 312 may be interleaved or alternated, such that a first conductor layer 312 may be associated with the busbar 306, a second conductor layer 312 proximate the first conductor layer 312 may be associated with the busbar 304, a third conductor layer 312 proximate the second conductor layer 312 may be associated with the busbar 306, etc. Interspersed between the conductor layers 312 may be a printed dielectric layer 314.

In some embodiments, the conductor layers 312 may be composed of a graphite oxide material to enhance thermal conductivity. In some embodiments, the dielectric layers 314 may be composed of polyimide.

Figure 4:
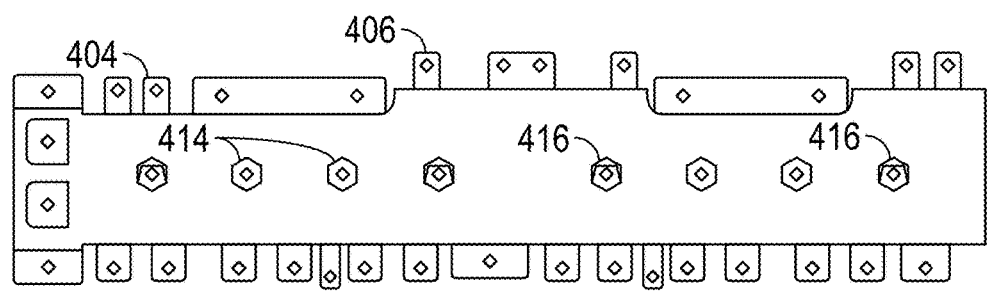
FIG. 4 illustrates an assembly drawing for an assembly comprising a busbar.

Referring to FIG. 4, an assembly drawing 400 is shown. The assembly drawing 400 may correspond to the assembly drawing 100 of FIG. 1.

The assembly drawing 400 may be associated with one or more busbars. For example, the busbars may be denoted by reference characters 404 and 406 in FIG. 4. The busbar 404 may be associated with a positive (+) voltage and may couple to a first busbar (e.g., busbar 304) integrated in a capacitor and the busbar 406 may be associated with a negative (−) or reference voltage and may couple to a second busbar (e.g., busbar 306) integrated in the capacitor. The busbars 404 and 406 may be brought out to one or more tabs or points 414 and 416, respectively. The tabs 414 and 416 may be used for one or more purposes, such as test points or to facilitate connecting an assembly associated with the drawing 400 to another assembly or piece of equipment.

The busbars 404 and 406 may be coupled to a cold plate (not shown). The cold plate may be used as part of a thermal mitigation strategy to reduce the temperature of one or more capacitors or to serve as a heat sink for drawing heat out of the capacitors.

Figure 5:
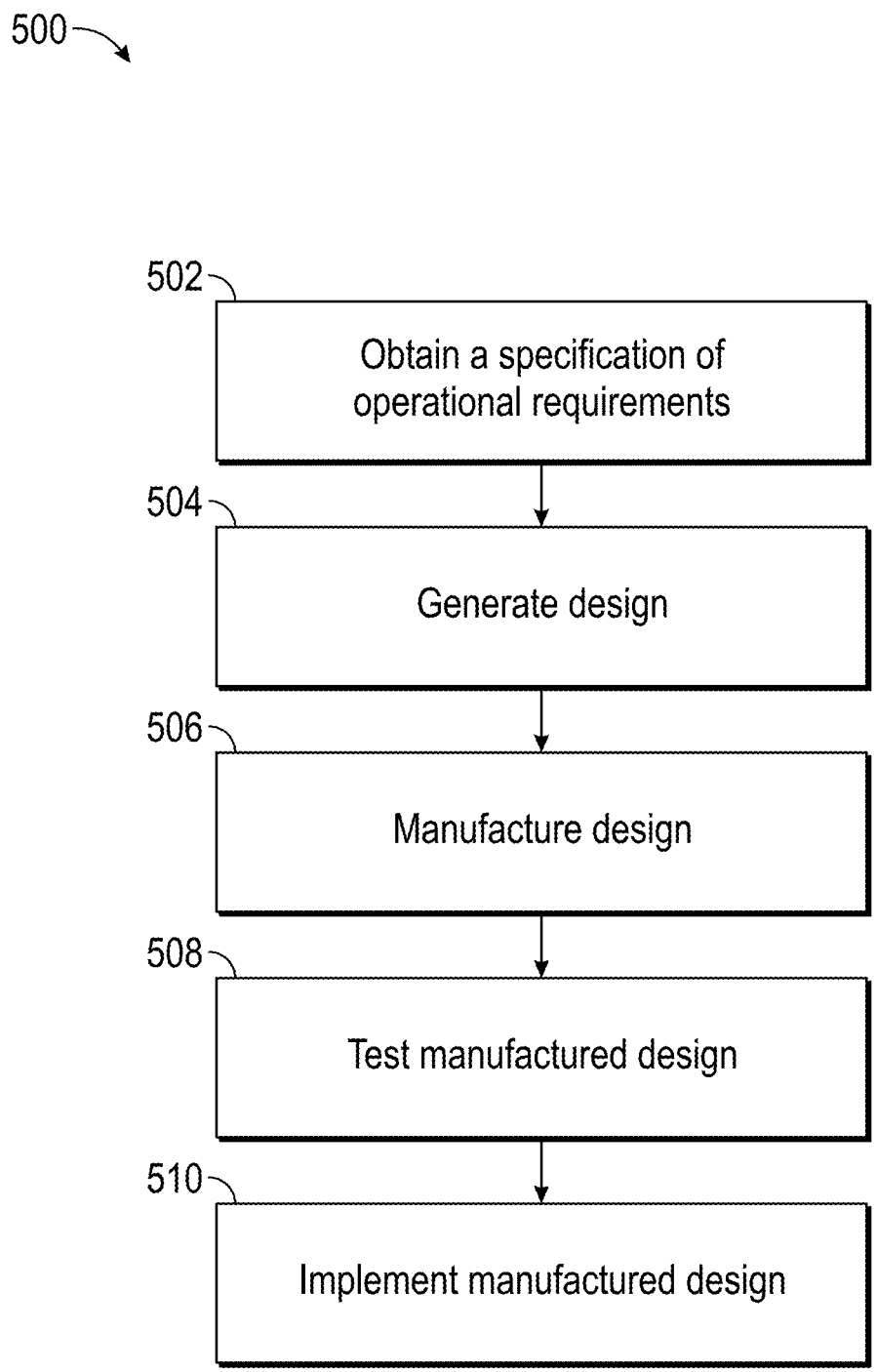
FIG. 5 illustrates a flow chart of an exemplary method.

Turning now to FIG. 5, a flow chart of an exemplary method 500 is shown. The method 500 may be executed in connection with one or more systems, assemblies, components, or devices, such as those described herein. The method 500 may be used to cheaply manufacture capacitors to fit into a small form-factor or profile while still being able to operate the capacitors at elevated power levels and temperatures.

In block 502, a specification of operational requirements may be obtained, e.g., received or generated. The operational requirements may specify one or more electrical characteristics (e.g., power, voltage, current), temperature characteristics, etc.

In block 504, a design may be generated that meets the requirements of block 502. For example, as part of block 504, a count of capacitors may be selected, a shape or geometry for the capacitors may be selected, one or more materials used to construct the capacitors may be selected, one or more techniques for manufacturing the capacitor may be selected, one or more features of the capacitor may be selected (e.g., a count of layers, integration of a busbar), etc.

In block 506, an assembly, a component, or any other entity at any level of abstraction may be manufactured in accordance with the design of block 504. For example, as part of block 506 a multilayer capacitor with an integrated busbar may be manufactured. The capacitor may be coupled to an assembly or other entity as part of block 506.

In block 508, the manufactured design may be tested. For example, the manufactured design may be tested to ensure that it satisfies the operational requirements of block 502. In the event that one or more of the requirements are not satisfied, flow may proceed from block 508 to, e.g., block 504 (not shown in FIG. 5) in order to modify the design. Otherwise, flow may proceed from block 508 to block 510

In block 510, the manufactured design may be implemented. For example, if a capacitor is manufactured in connection with block 510, the capacitor may be coupled to an assembly. The coupling of the capacitor and the assembly may include coupling an integrated busbar of the capacitor to a busbar located on the assembly.

The method 500 is illustrative. In some embodiments, one or more of the blocks or operations (or a portion thereof) may be optional. In some embodiments, additional blocks or operations not shown may be included. In some embodiments, the blocks or operations may execute in an order or sequence that is different from what is shown in FIG. 5.

Embodiments of the disclosure may be used in connection with one or more applications or environments, such as power sources, converters, inverters, motor drives, links, input/output filters, etc. In connection with use on a link, such as a direct current (DC) link, capacitance may be distributed across or along the link while reducing inductance along the link. As such, link performance may be enhanced.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented as one or more apparatuses, systems, and/or methods. In some embodiments, instructions may be stored on memory or one or more computer-readable media, such as a transitory and/or non-transitory computer-readable medium. The instructions, when executed (by, e.g., one or more processors), may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A capacitor manufactured by application of an additive manufacturing technique, comprising:
   a plurality of conductor layers;
   a plurality of dielectric layers interspersed between the conductor layers; and
   a first busbar comprising a first terminal at an exterior of the capacitor, the first busbar being directly coupled to a first subset of the conductor layers and the first subset comprising at least two conductor layers which are unconnected to each other except through the first busbar; and
   a second busbar comprising a second terminal at an exterior of the capacitor, the second busbar being directly coupled to a second subset of the conductor layers different than the first subset and the second subset comprising at least two conductor layers which are unconnected to each other except through the second busbar.

2. The capacitor of claim 1, wherein:

the first busbar and the first terminal extend transversely relative to the first subset of conductor layers, the second busbar and the second terminal extend transversely relative to the second subset of conductor layers, and the first and second subsets of conductor layers respectively extend outwardly from opposing sides of the first and second busbars and are interleaved with respect to one another.

3. The capacitor of claim 1, wherein the dielectric layers are made of polyimide, and wherein the conductor layers are made of a graphite oxide material.

4. The capacitor of claim 1, wherein the first busbar is configured to couple to a second busbar located on an assembly.

5. The capacitor of claim 1, wherein the capacitor is manufactured in accordance with a direct write technology.

6. The capacitor of claim 1, wherein the capacitor is manufactured in accordance with a laser engineered net shaping technique.

7. A capacitor, comprising:

a body;

a first busbar comprising a first terminal supportively disposed within the body such that the first terminal extends outwardly from the body;

a second busbar comprising a second terminal supportively disposed within the body such that the second terminal extends outwardly from the body;

first conductor layers extending through the body and toward the second busbar from a side of the first busbar facing the second busbar;

second conductor layers extending through the body and toward the first busbar from a side of the second busbar facing the first busbar, the first and second conductor layers being interleaved with one another; and dielectric material provided in layers interposed between sequential first and second conductor layers and as hairpin sections interposed between respective ends of the first and second conductor layers and the second and first busbars, respectively.

8. The capacitor according to claim 7, wherein the first and second terminals respectively comprise voltage buses.

9. The capacitor according to claim 7, wherein the first and second busbars and the first and second terminals are substantially parallel with each other and transversely oriented relative to the first and second conductor layers and the layers of the dielectric material.

10. The capacitor according to claim 7, wherein the first and second busbars and the first and second terminals are substantially parallel with each other and perpendicular relative to the first and second conductor layers and the layers of the dielectric material.

11. The capacitor according to claim 10, wherein the hairpin sections of the dielectric material form 180° angles about the respective ends of the first and second conductor layers.

12. The capacitor according to claim 10, wherein the dielectric material comprises polyimide and the first and second conductor layers comprise graphite oxide.

* * * * *